United States Patent [19]
Blevins

[11] 3,783,296

[45] *Jan. 1, 1974

[54] METHOD AND APPARATUS FOR DETECTING FLAWS IN A FABRIC WEB

[75] Inventor: Maurice E. Blevins, Spartanburg, S.C.

[73] Assignee: Deering Milliken Research Corporation, Spartanburg, S.C.

[ * ] Notice: The portion of the term of this patent subsequent to Apr. 18, 1989, has been disclaimed.

[22] Filed: Apr. 14, 1972

[21] Appl. No.: 244,200

Related U.S. Application Data

[63] Continuation of Ser. No. 18,196, March 10, 1970.

[52] U.S. Cl............. 250/550, 250/237 G, 250/572, 356/168
[51] Int. Cl. .......................................... G01n 21/30
[58] Field of Search................. 250/219 R, 219 DF, 250/219 WE, 237 G; 356/167, 168, 169, 170, 71; 350/162 R, 162 SF; 26/51.5

[56] References Cited
UNITED STATES PATENTS

| | | |
|---|---|---|
| 3,614,232 | 10/1971 | Mathisen ..................... 250/219 DF |
| 3,169,193 | 2/1965 | Strang......................... 250/219 WE |
| 3,633,037 | 1/1972 | Langenbeck ................ 250/219 WE |
| 3,623,815 | 11/1971 | Fontanel.......................... 250/219 S |
| 3,652,864 | 3/1972 | Person ....................... 250/219 WE |
| 3,308,658 | 3/1967 | Bryan ......................... 250/219 WE |
| 3,657,727 | 4/1972 | Blevins ....................... 250/219 WE |

*Primary Examiner*—James W. Lawrence
*Assistant Examiner*—D. C. Nelms
*Attorney*—H. William Petry and Arthur L. Urban

[57] ABSTRACT

A method and apparatus to inspect and detect deviations in a repetitive mesh pattern from a predetermined norm for the particular mesh pattern wherein a highly collimated monochromatic light beam, such as a laser beam, is directed to pass through the mesh pattern, such as a woven or knitted fabric, is diffracted by the mesh pattern, and the diffracted laser pattern is directed onto a mask which is indicative of a norm for the mesh pattern. A light-detecting apparatus, such as a photocell, is placed beyond the mask and any deviation in the mesh of the fabric from a predetermined norm for that particular fabric results in a deviation of the diffracted pattern of the laser beam through the mask which affects, and is detected by, the photocell.

2 Claims, 11 Drawing Figures

METHOD AND APPARATUS FOR DETECTING FLAWS IN A FABRIC WEB

This is a continuation of application Ser. No. 018,196 filed Mar. 10, 1970.

The present invention relates to a method and apparatus to detect variations in the pattern of an open mesh weave and more particularly to a method and apparatus to detect faults or flaws appearing in a moving web having a repetitive pattern, such as a woven or knitted fabric as it comes from a weaving or knitting machine.

In weaving or knitting textiles, the fabric comes from the loom or knitting machine as a continuous moving web and is wound onto rolls, which rolls usually are then shipped to ultimate fabric users for processing.

Prior to rolling the fabric onto rolls, it is imperative to determine if any flaws in the woven or knitted fabric are present in order to eliminate the possibity that the ultimate fabric user or processor will expend time and effort in making up the goods into furnished items before such faults or flaws finally are detected. Ideally, it is best to have such a fabric flaw detecting apparatus on the loom or knitting machine and as close as possible to the actual point in the loom where the mesh is formed so that when a flaw is detected, the loom or knitting machine can be stopped, reversed and the flow immediately corrected before the flawed web is rolled into a completed roll. Many devices have heretofore been proposed for use in conjunction with a loom or knitting machine in order to detect flaws in the woven or knitted fabric prior to the fabric being rolled. Such devices include mechanical sensing means in contact with the fabric web to detect flaws therein; or, more commonly, photoelectric flaw-detecting apparatus wherein a light from a light source is passed through the fabric web and directed to impinge on a photocell so that the variation of light intensity can be used to indicate apparent flaws in the fabric web.

These devices have not been very satisfactory for many reasons. The mechanical sensing means do not have sufficient sensitivity to detect minor flaws; and these optical systems using photoelectric cells are not suitable for colored fabric material, and frequently are unstable and unreliable because voltage fluctuations tend to vary the intensity of the light detected by the photoelectric cell. Also, such optical systems are affected by ambient light which detracts from the accuracy of the flaw detection.

Accordingly, it is an object of the present invention to provide a method and apparatus to detect flaws in a fabric web which obviates the aforementioned disadvantages of prior art devices.

It is a further object of the present invention to provide a method and apparatus to detect flaws in a woven or knitted fabric web with a high degree of accuracy and sensitivity.

It is a still further object of the present invention to provide a method and apparatus for detecting flaws in a woven or knitted fabric web of any weave or knit configuration with a consistently high degree of accuracy.

In a preferred embodiment of the present invention a laser beam is directed through a scattering matrix, such as a fabric cloth having a repetitive mesh pattern, for example, woven or knitted, and the emergent diffracted beam is directed to impinge upon a mask, which may be a photographic film, having a pattern thereon indicative of the particular pattern of the weave or knit configuration without flaws and which obscures the light from the laser beam. If a deviation in the pattern of the diffractive scatter pattern occurs because a flaw is present in the fabric, the diffracted light pattern resulting from the laser beam passing through the fabric is altered by reason of the flaw from the mask pattern of the normal diffraction, and this deviation of the diffracted light pattern then can be detected by a photocell. Since the mask pattern is indicative of the desired norm for the particular fabric without flaws, any change of this light pattern as it passes through the mask is detected by the photocell and is immediately indicated by appropriate signal means to show that a flaw is detected.

Figure 1:
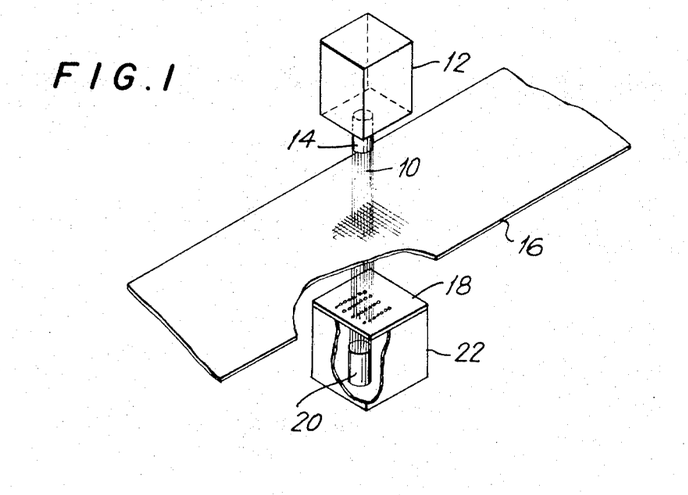
FIG. 1 is a diagrammatic perspective representation of a preferred embodiment of the present invention schematically illustrating the orientation of the laser, the fabric to be inspected and the mask and photocell of the detector unit.

With reference to the drawings and particularly FIG. 1, there is shown a diagrammatic representation of the elements of the present invention wherein a highly collimated and substantially monochromatic light beam, such as a laser light beam 10 from a suitable laser 12, for example, a helium gas laser generator, having a beam emitter lens arrangement 14, is directed to be incident on a web of woven or knitted fabric 16. The fabric web 16 is a continuously moving web, for example, one coming from a loom or knitting machine (not shown), which must be inspected for faults or flaws prior to being rolled onto a roll for shipping to an ultimate user.

The fabric web 16 is of an open mesh weave, that is, there are laterally and longitudinally disposed threads which are interwoven in a repetitive fashion to form the fabric. Thus, when the laser light beam 10 is directed to be incident on the fabric web, it will be diffracted due to the threads of the fabric and scattered as it passes through the fabric web. For any desired weave or knit configuration for the fabric web 16 there will result a unique typical diffraction pattern when the laser beam is directed to pass through the fabric web. Thus, for any particular style weave or knit fabric without flaws, there will result a characteristic diffraction pattern. When a flaw is present in the fabric, a change in the diffraction pattern will result.

The characteristic diffraction pattern for the particular style weave or knit of fabric web 16 is placed on a mask 18. Mask 16 is preferably a photographic film or plate which has been exposed to a laser beam passing through a segment of a fabric web known to have no flaws or defects. The mask 18 thus has an exposure on its surface which is characteristic of the desired diffraction pattern obtained when a laser beam passes through a fabric web, similar to the fabric web 16 to be inspected, which has no flaws or faults.

The mask 18, since it is a photographic film or plate allows light to pass therethrough. Thus, when the laser beam 10 is directed through a web 16 and onto mask 18, and if there are no flaws or faults in the fabric web 16 where the laser beam impinges, then the diffracted light pattern impinging on mask 18 immediately below fabric web 16 will correspond to the diffraction pattern on mask 18.

However, if a fault or flaw is present in the fabric web, then when the laser beam 10 impinges on the fault or flaw, a diffraction pattern will result below the fabric web 16 which will not correlate with the pattern on mask 18 for a flawless web. Hence, more or less light, depending on the type of flaw, will pass through mask 18 and cause a deviation in intensity of the normal light pattern for the fabric web 16 without flaws or faults. To detect this deviation in light intensity a light detector, such as a photocell 20, is placed immediately below mask 18. Photocell 20 may be placed in a suitable housing 22 which also serves as a support for mask 18. Photocell 20 is connected to a suitable alarm circuit (not shown) which may be adapted to provide a warning signal, or even to stop the loom or knitting machine, so that when any fault or flaw is indicated, the weaving or knitting operation may be stopped to immediately correct the fault or flaw.

In practice, the fabric web 16, coming from a loom or knitting machine, will be a continuously moving web on the order of 60 inches wide and typically moving at a rate of 4 inches per minute. Ideally, the inspection of the fabric web 16 should be carried out so that 100 percent of the fabric is inspected. Accordingly, the laser beam generator on one side of fabric web 16, and the detector unit 22 comprising the mask 18 and photocell 20 on the other side of fabric web 16, should be made to laterally scan the web 16 in unison so that as the laser beam 10 moves laterally across web 16 it always impinges with precise registry on the mask 18 and photocell 20. Thus, means must be provided to allow both the laser unit 12 and detected unit 22 to traverse and return in a path transverse to the moving fabric web 16. Such apparatus will be more fully described hereinafter.

If the laster spot size which impinges on the fabric web 16 is enlarged then the speed of transverse of the laser and detector units may be reduced. Such a reduction in traversing speed is desirable as increased mechanical stability of the traversing mechanism may be obtained for lower traversing rates. Additionally, other benefits are obtained in that irregularities in illumination are averaged out and the diffraction pattern below fabric web 16 is sharper since the resolution through a grating, such as fabric web 16, is proportional to its illumination width.

Figure 2:
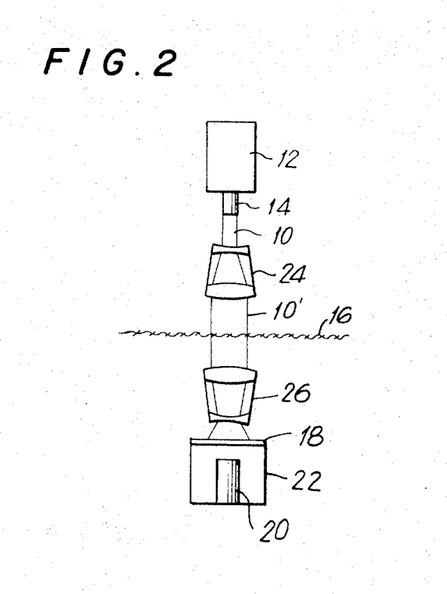
FIG. 2 is an elevational schematic view showing an alternate embodiment of the present invention.

Accordingly, in an alternative embodiment of the present invention, an optical magnifier, such as a telescope, is used to enlarge the spot size of the laser beam 10 which impinges on the fabric web 16. With reference to FIG. 2, it is seen that a telescope 24, which may be of the Galilean type having a magnification of about ten power, is fixed in any suitable manner in the path of the laser beam 10. Thus, telescope 24 enlarges the effective diameter of the laser beam 10 so that the beam 10' which impinges on fabric web 16 is larger than the initial beam 10 from the laser generating unit 12. In this way, a larger spot size or area can be inspected on each traverse of the fabric web 16.

Additionally, to increase the angular dimension of the diffraction pattern which is incident on mask 18, a second telescope 26 may be employed and positioned below fabric web 16 so that the diffraction pattern resulting from the laser beam passing through fabric web 16 may also be enlarged and focused.

Figure 3:
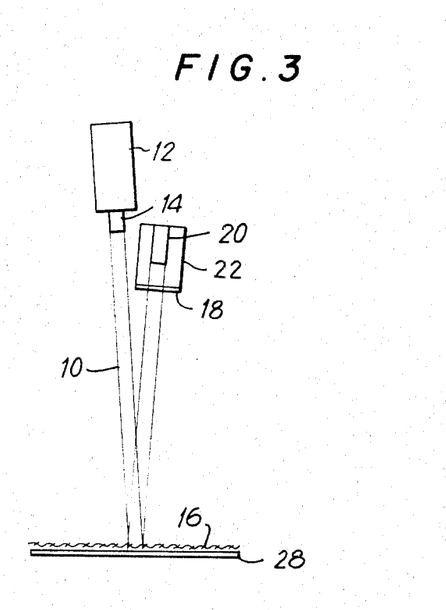
FIG. 3 is a view similar to FIG. 2 showing still another alternate embodiment of the present invention.

In FIG. 3, another embodiment is shown wherein both the laser unit 12 and detection unit 22 may be positioned on the same side of fabric web 16. In this embodiment, a mirrored surface 28 is placed immediately below fabric web 16. The laser beam 10 then passes through web 16 and is reflected back up through the web onto mask 18 of the detector unit where the correlation between the diffracted pattern of the laser beam and the pattern on mask 18 can be made to indicate the presence of any flaws in the fabric web 16.

Figure 4:
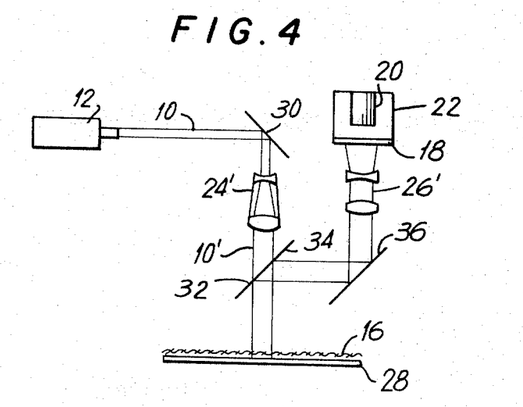
FIG. 4 is another schematic representation of another embodiment of the present invention wherein the laser beam generator is fixed with respect to the fabric scanning apparatus.

In each of the embodiments shown in FIGS. 1-3, the laser unit 12 must traverse the fabric web so that the laser beam 10 can traverse the web. It may be desirable to fix the laser generating unit 12 to eliminate the necessity of having unit 12 itself traverse the width of web 16, thus reducing the bulk and the mass of the traversing mechanism. Accordingly, as seen in FIG. 4 in an alternate embodiment, the laser unit 12 is positioned in a fixed location above fabric web 16 and oriented so that beam 10 from unit 12 is parallel to the web 16 and incident on a mirrored surface 30 disposed at a 45° angle to beam 10. Mirror 30 thus reflects the beam downward toward web 16 and, if desired, is passed through a telescope 24' to enlarge the spot size as in the embodiment of FIG. 2. The enlarged beam 10' then passes through a standard beam splitter 32 oriented at a 45° angle to the beam down through fabric web 16. A mirrored surface 28 immediately below fabric web 16 reflects the now diffracted beam back through web 16, as in the embodiment of FIG. 3, and this reflected beam is in turn reflected by the mirrored surface 34 of beam splitter 32 to a mirrored surface 36, also disposed at a 45° angle to the incident light beam. The diffracted beam is now reflected by mirrored surface 36 through a second telescope 26' which focuses the diffrcation pattern prior to its impinging on mask 18 of the detector unit 22.

In this manner, only the reflector surfaces 30 and 36, the beam splitter 32, the telescopes 24' and 26' and the detector unit 22 need be made to transverse the web 16. Since the laser beam 10 from laser unit 12 is highly collimated, no discernible difference is ascertainable between the beam incident on mirrored surface 30 at either extremity of web 16.

Figure 5:
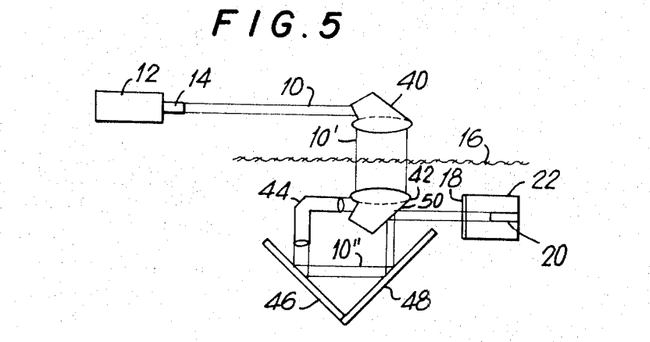
FIG. 5 is a view similar to FIG. 4 showing another alternate embodiment of the present invention.

In yet another embodiment, see FIG. 5, a fixed position for laser unit 12 may be utilized with the initial beam 10 being refracted by a cast-plastic single-surface-refraction telescope 40. The refracted and enlarged beam 10' now passes through fabric web 16 and is refracted by another cast-plastic single-surface refraction telescope 42 through an optical system comprising reflector member 44 and a pair of mirrored surfaces 46 and 48 disposed at a 90° angle to each other, with mirrored surface 46 being oriented at a 45° angle to the incident beam from reflector member 44. This beam 10'' is further reflected by mirrored surface 48 to a mirrored surface 50 mounted on the rear of refractory telescope 42 and is again reflected to the mask 18 of the detector unit 22 where the correlation between the diffracted pattern and the pattern on mask is made.

With this embodiment the upper refractory telescope 40 and the lower unit comprising telescope 42, reflecting unit 44, mirrors 46 and 48 and the detector unit 22 must be made to traverse web 16 in unison as in the embodiment of FIGS. 1 and 2.

Any suitable mechanical system can be utilized in order to make an upper and lower unit traverse a path across fabric web 16 in unison. One preferred embodiment of such a system is shown in FIG. 6, it being understood that, as shown, the system of FIG. 6 can be utilized with the embodiments of FIGS. 1, 2 and 5, and that only the upper portion of the system —to provide a means to traverse a path on one side of fabric web 16—— need be employed for the embodiments of FIGS. 3 and 4.

Figure 6:
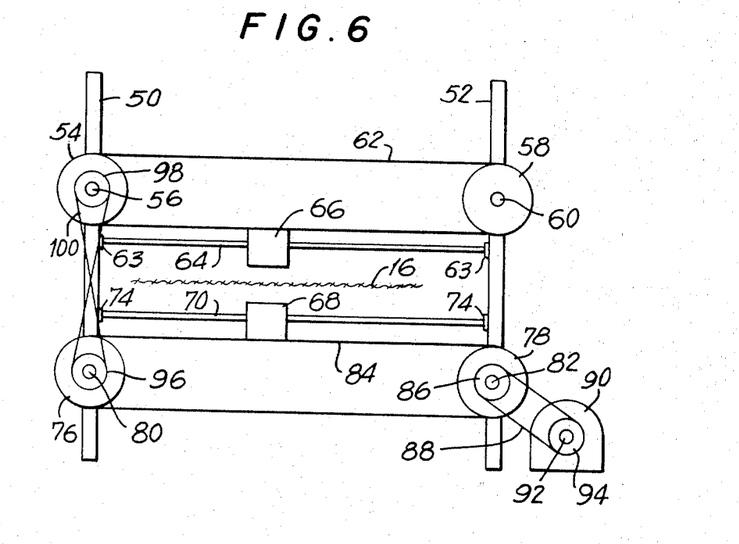
FIG. 6 is an elevational, diagrammatic representation of the system to transverse the width of a fabric web with the detecting apparatus of the present invention.

As seen in FIG. 6, vertical support members 50 and 52 are disposed on opposite sides of the moving web 16. A gear member 54 is rotatably mounted, for example on a shaft 56, to vertical support 50 at an elevation above fabric web 16 and a gear member 58 is rotatably mounted, for example on shaft 60, at the same elevation above fabric web 16 on vertical support 52. An endless-loop chain-link drive member 62 is operatively engaged around gears 54 and 58 so that rotation of either gear 54 or 58 will result in movement of the chain drive 62. It is to be understood that gears 54 and 58 could be pulley members and chain drive member 62 could be a belt member, if so desired. Immediately below gear 54 and gear 58 on vertical supports 50 and 52, respectively, are mounted bracket support plates 62 and a pair of horizontally extending guide rods 64 are secured to each support plate 62 on the vertical supports 50 and 52. Slidably disposed on the pair of horizontally extending guide rods 64 is an upper traversing unit 66. It is to be understood that the upper traversing unit 66 may comprise the laser generating unit 12, telescopes 24 or 40 or the total assembly shown in the embodiments of FIGS. 3 and 4. Thus, unit 66 may include any of the elements which must traverse the fabric web 16. Consequently, the lower runs of chain drive 62 are rigidly connected to traversing unit 66 so that when chain 62 is driven by rotation of either of the gears 54 or 58 the traversing unit 66 will move along the guide rods 64 in a path transverse to moving web 16.

Similarly, a lower traversing unit 68 is provided which, as for the upper traversing unit 66, may comprise the detector unit 22, telescope 26 or the assembly shown in FIG. 5 below fabric web 16. Lower unit 68 is similarly disposed along a pair of guide rods 70 secured at their ends to brackets 74 mounted on the vertical supports 50 and 52, respectively. Lower gear members 76 and 78 are provided mounted on shafts 80 and 82 on vertical supports 50 and 52, respectively, and an endless-loop chain drive 84 is operatively associated with each of the lower gear members 76 and 78. As with the upper traversing unit 66, the lower traversing unit 68 is secured to the upper run of drive chain 84 so that movement of drive chain 84 will cause lower traversing unit 68 to slide along guide rods 70.

Rotatably mounted on shaft 82 and rigidly secured to gear 78 is a drive gear 86 having an endless-loop drive chain 88 engaged therewith. A motor 90 having an output shaft 92 secured to a gear 94 is also engaged with drive chain 88 so that when motor 90 is actuated, drive chain 82 imparts rotative motion to gear 86 to rotate gear 78 and cause movement in chain 84.

Since the upper and lower traversing units 66 and 68 must be moved in unison, the drive member for upper unit 66 is keyed to the movement of the lower unit 68. For this purpose, an additional gear 96 rotatably mounted on shaft 80 and rigidly fixed to gear 76 is provided for the lower traversing assembly. Similarly, an auxiliary gear 98 rotatably mounted on shaft 56 and rigidly fixed to gear 54 is also provided for the upper traversing assembly. An endless-loop crossed drive chain 100 is operatively engaged with the gears 96 and 98 so that when motor 90 is operated, the upper run of chain 84 and the lower run of chain 62 move in the same direction thereby causing traversing unit 66 and 68 to move in unison and in the same direction.

Motor 90 is provided with limit switches and is a reversible motor with the limit switches being set so that the extent of movement of upper and lower traversing units 66 and 68, respectively, is sufficient to traverse the width of web 16 before motor 90 is reversed to allow traverse by units 66 and 68 in the opposite direction.

Where only an upper traversing unit 66 need be provided, for example in the embodiments of FIGS. 3 and 4, the lower assembly may of course be eliminated and motor 90 is connected in direct drive to the gear system of the upper traversing assembly. Additionally, for the embodiments of FIGS. 4 and 5, the laser unit 12 is mounted on one of the vertical supports 50 and 52 and oriented so that the beam 10 is directed to the appropriate reflecting or refracting surface within upper traversing unit 66.

Reference is now made to FIGS. 7-11 wherein there is shown on a greatly enlarged scale segments from typical weave or knit configurations including segments of weave configurations having commonly found flaws therein, and diagrammatic representations of the diffraction pattern which would result from the passage of a laser beam through the particular weave or knit configuration.

As noted above, when a laser beam passes through the open mesh weave or knit of the fabric, the laser beam is diffracted by the threads of the knit or weave into a diffraction pattern which is unique for the particular weave configuration of the fabric web. Because the light emitted from a laser generating unit is of a single wave length, i.e., monochromatic, and the light waves from the laser are in-phase along both time and space axes, i.e., they are coherent, and the laser beam is highly collimated, i.e., the laser beam spreads no more than one-third inch per mile, the diffraction pattern resulting when the laser beam passes through an open mesh weave which has a uniformly repetitive configuration would also be uniformly the same. In addition, because the light is monochromatic, the diffraction of the laser light beam through the web does not result into a separation of the light into the colored spectrum. Because this is so, and because the diffraction pattern is the same and is not effected by the relative movement of the fabric web with respect to the laser beam, the diffraction pattern from the beam passing through the fabric, if there are no faults or flaws present in the fabric, will coincide with the diffraction pattern impressed on the mask, which pattern is initially obtained from a fabric of the same configuration of the fabric to be inspected having no flaws and which is then used as the benchmark or norm for the inspection of the fabric web 16 coming from a loom or knitting machine.

When the laser beam is passed through the fabric web the resultant diffraction pattern will have fixed and constant intensity for any flawless weave configuration. Thus, for flawless weaves, the diffraction pattern obtained as a result of a laser beam passing through the weave will impinge upon the obscuring mask 18 and the pattern on the mask will obscure a portion of the rediffracted light pattern while allowing some light to pass therethrough to be incident on the photocell. This light incident on the photocell will cause the photocell to respond and produce an electrical response which would be indicative of the normal intensity of illumination resulting from the diffraction pattern of a flawless web. Should a flaw in the web now be detected, the diffraction pattern will be altered thus changing the pattern of diffracted light incident on mask 18 and, depending on the type of flaw detected, more or less light will pass through the mask to the photocell. Thus, a variation of the intensity of the light detected by the photocell, either a greater or a lesser intensity, will indicate the presence of a flaw in the web.

Figure 7:
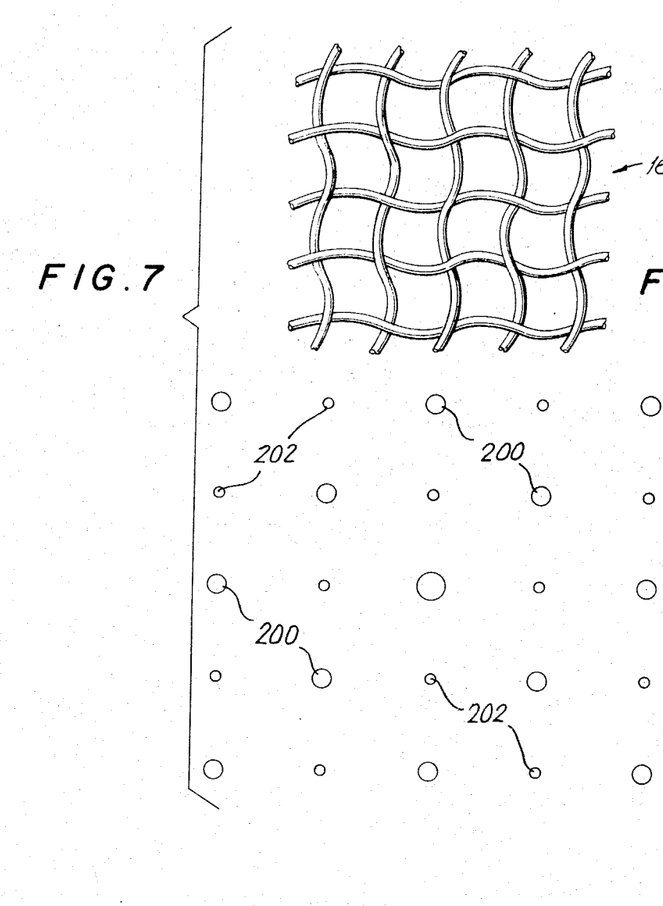
FIGS. 7–11 are weave or knit configurations and their companion mask patterns.

With reference now to FIG. 7, there is shown a segment of a simple basket weave pattern having longitudinally and laterally extending threads to form a substantially square mesh pattern. When the laser beam is incident on such a weave configuration, the resultant diffraction pattern for mask 18 would be, as shown immediately below, the respresentation of the basket weave for fabric 16 shown in FIG. 7. Essentially, the pattern is a series of dots arranged in a square matrix with dots 200 at the corners of the square having a greater magnitude than a series of dots 202 approximately midway between adjacent dots 200. These dots appear on the photographic film and result from exposing the film to the diffracted pattern of the laser light. The variation in magnitude between dots 200 and 202 results because after the laser light has passed through the fabric web, it is scattered outwardly in a diverging pattern by a particular segment of the fabric. Because the light is collimated, the divergent diffraction acts like a plurality of sinusoidal wave fronts with a greater amplitude nearest the center of the diverging light. These wave fronts strike the photographic mask to produce the dots and certain of the dots are reinforced by other laser wave fronts diffracted from another segment of the fabric so that their magnitude is increased. It is to be understood that many variations for the mesh pattern 18 may be obtained when the configuration of the weave and/or the spacing between threads is varied, but a distinct pattern will result which is distinctive for the particular flawless weave.

Figure 8:
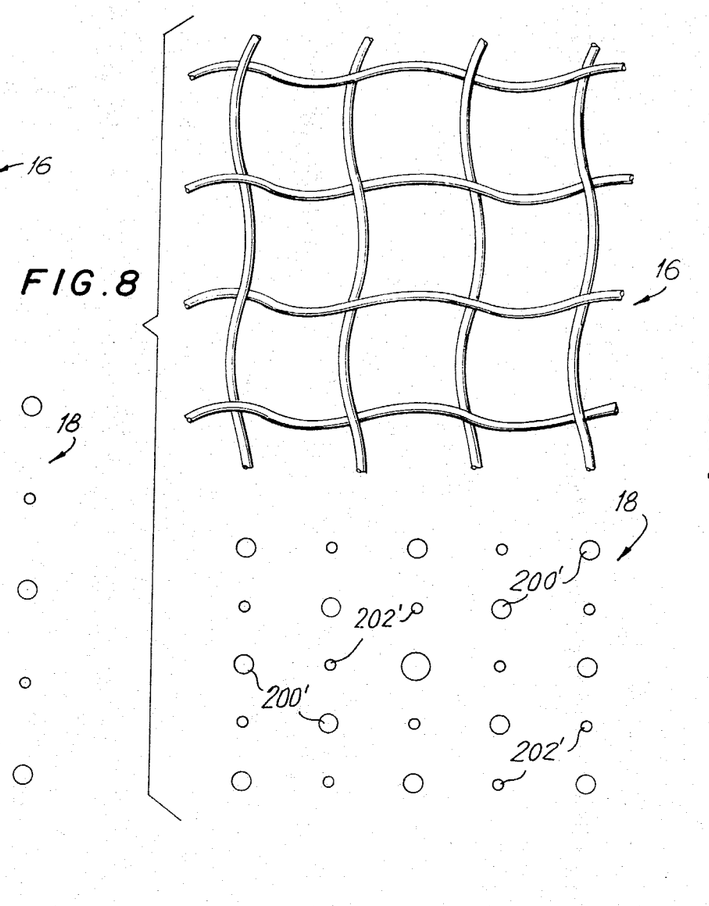

An illustration of one variation is shown in FIG. 8 which is a fabric web 16 having a basket weave with a greater spacing between threads than the weave in FIG. 7. The resultant mask pattern 18 is somewhat similar to the pattern for the tighter weave of FIG. 7 but the dots 200' and 202' are closer together. This is so because a smaller spacing between threads in a fabric weave results in a wider diffraction pattern.

Figure 9:
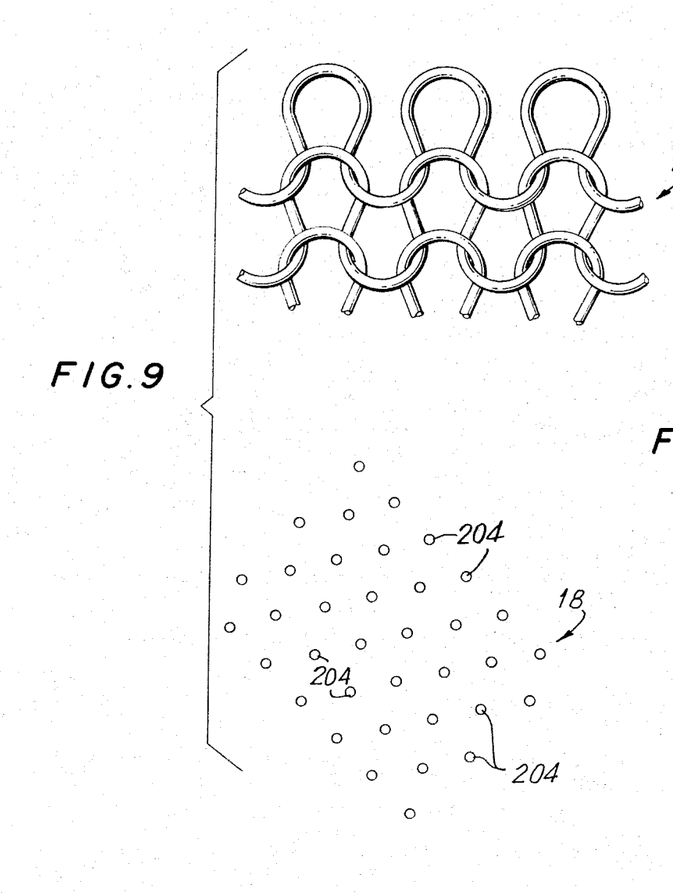

FIG. 9 illustrates a knit fabric web 16 and a representation of its companion diffraction pattern for mask 18. Here, it is seen that an angularly disposed offset square pattern for dots 204 results. However, it is to be understood that the relationship of the dots will vary depending upon the style of knit and the tightness of the knit.

Figure 10:
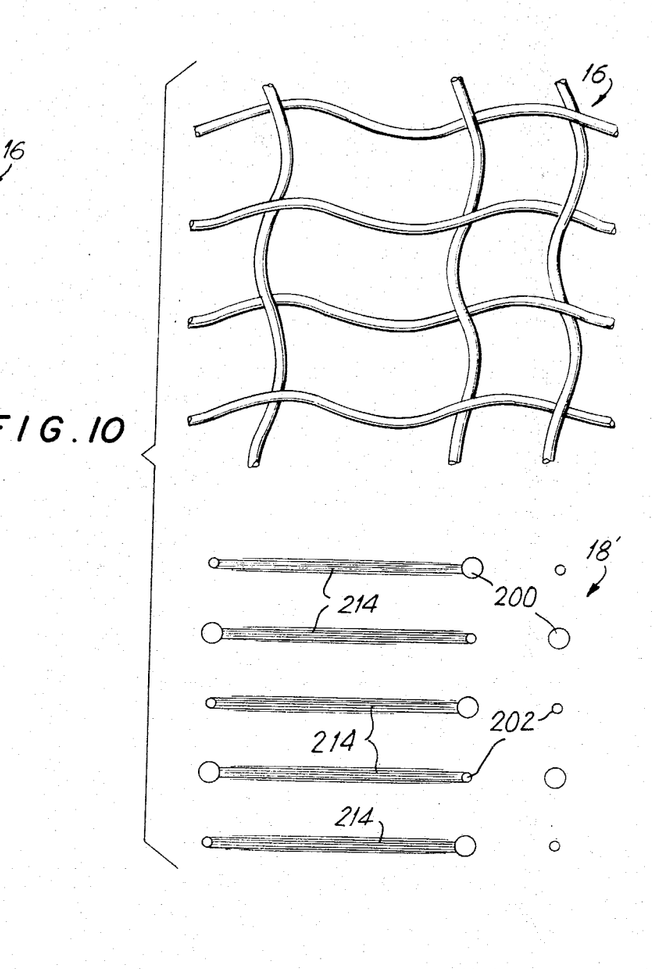
Figure 11:
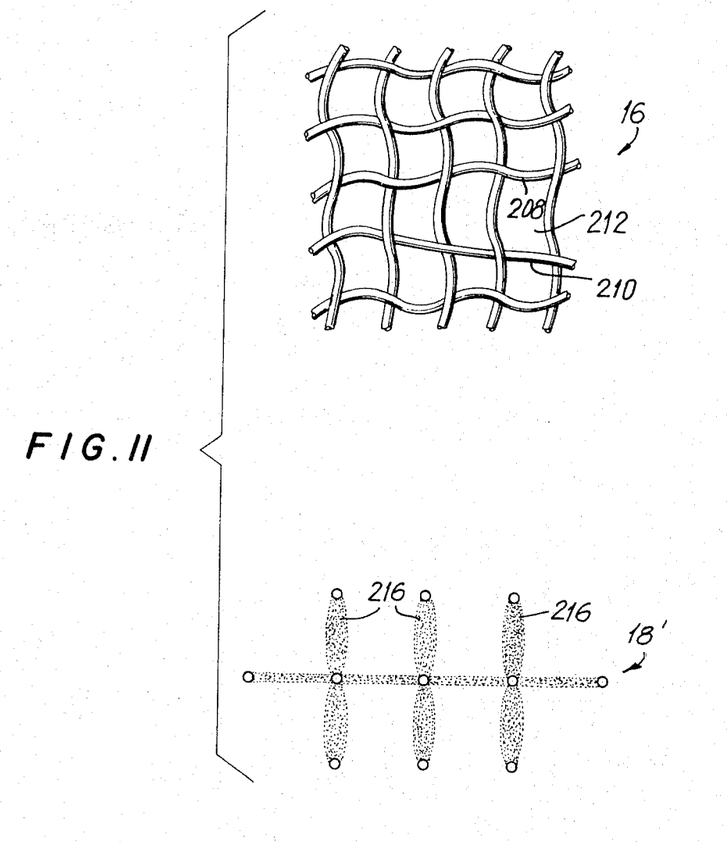

FIGS. 10 and 11 portray diagrammatic representations of typical flaws which may develop in a fabric web 16, i.e., a missing thread in the area 206 of the weave in FIG. 10 and a skew between threads 208, 210 in the area 212 of the fabric web 16 in FIG. 11, and the resultant diffraction pattern which would be exposed on a film 18' to illustrate the type of deviation from the normal pattern which may be expected. Note that for the missing thread in FIG. 10, the diffraction pattern results in a solid line 214 which interconnects what would normally be the dots 200, 202 of the diffraction pattern for a flawless weave. The diffraction pattern for the skewed flaw shown in FIG. 11 is illustrated as being a plurality of highly concentrated dots 216 along a line coincident with the line which would pass through dots 200, 202 of the pattern on mask 18 for a flawless weave.

While the particular pattern obtained from each style weave or knit, or for each type of flaw which may be encountered, is not critical, what is material is that each repetitive weave or knit will produce a unique and characteristic diffraction pattern. The diffraction pattern for a particular weave or knit without flaws will be the same and thus, when the laser light is passed therethrough to be incident on a mask, such as a photographic film or plate on which the characteristic diffraction pattern for that particular weave or knit is impressed, the diffracted laser light will correlate with the pattern on the mask. When a flaw in the weave or knit is present, the diffraction pattern will be altered and the light pattern incident on the mask will deviate from the mask pattern so that light of a greater or lesser intensity, depending on the type flaw encountered, will pass through the mask and be detected by the photoelectric cell. In this manner, the presence of a flaw in the moving fabric web can be immediately detected and corrected.

While the invention has been described in a preferred embodiment herein as utilizing a light source such as laser light, it is to be understood that other types of light may be employed. Laser light is particularly suited because of its characteristic of being monochromatic and very highly collimated. However, a source of light having a narrow spectral band which is then collimated may also be employed if so desired.

I claim:

1. In an apparatus to detect flaws in a web of material, the combination of, a highly collimated substantially monochromatic light source positioned to be incident on said web of material and to be diffracted by said web of material as said light passes therethrough, means to detect deviations of the diffracted light pattern including a mask comprising a light transparent plate having impressed thereon a mask pattern which correlates with the diffracted light pattern of a web of said material known to have no flaws and light detecting means below said mask adapted to detect variations in light intensity passing through said mask whereby when said light beam passes through a flawless web of said material, the diffracted light pattern will correlate with the light pattern exposed on said mask and when said light beam passes through a flaw in the web of said material, the diffraction pattern will deviate from the pattern exposed on said mask to alter the intensity of light passing therethrough to the light detecting means which detects the change in light intensity to indicate the presence of a flaw in said web of material.

2. Apparatus as defined in claim 1 wherein said web of material is adapted to move with respect to said apparatus to detect flaws while flaws are detected in said web of material.

* * * * *